UNITED STATES PATENT OFFICE.

WERNER SCHMIDT, OF FRANKFORT-ON-THE-MAIN, GERMANY, ASSIGNOR TO CASSELLA COLOR COMPANY, OF NEW YORK, N. Y.

YELLOW SULFUR DYE AND PROCESS OF MAKING SAME.

No. 892,455.  Specification of Letters Patent.  Patented July 7, 1908.

Application filed January 24, 1907. Serial No. 353,933.

*To all whom it may concern:*

Be it known that I, WERNER SCHMIDT, doctor of philosophy, a citizen of Prussia, and a resident of Frankfort-on-the-Main, in the Province of Hesse-Nassau and Kingdom of Prussia, Germany, have invented certain new and useful Improvements in Yellow Sulfur Dye, of which the following is a specification.
I have discovered that when heating dehydrothio-p-toluidin, or analogous compounds such as primulin bases, with sulfur and benzidin or thiobenzidin, bodies of a yellow color are obtained which, on being treated with concentrated solutions of alkaline sulfids, or caustic alkalies, are transformed into soluble coloring matters dyeing fast yellow shades on cotton. The proportions of the melt may be varied within large limits, but it is advantageous to use 1 to 3 parts of sulfur to one part of a mixture of about equimolecular quantities of dehydrothiotoluidin and benzidin. The melting temperatures should exceed 180° C. The transformation into soluble coloring matters is best done at about 120° C. with 1 to 3 parts sodium sulfid for 1 part of the melt, or by means of a corresponding quantity of caustic soda lye. The new coloring matters are distinguished by their beautiful greenish yellow shade and exceptional fastness to washing.

Example: A mixture of 16 kilos dehydrothiotoluidin, 19 kilos benzidin and 70 kilos sulfur are heated in a baking stove for about 12 hours to 210° C. The melt is then ground and introduced into 240 kilos melted sodium sulfid crystals; the whole is thereupon heated to 120 or 125° C. until a sample taken out gives a clear solution in water. It is then diluted with 600 liters water, the solution filtered off and the coloring matter precipitated with 75 kilos muriatic acid or an analogous precipitating agent. The thus produced coloring matter is insoluble in water, acids and organic solvents. It dissolves in concentrated sulfuric acid with a yellowish-gray color, being precipitated from this solution by the addition of water, in brown flakes. It dissolves in concentrated soda lye with a yellowish-brown shade. It is easily soluble in solutions of sodium sulfid, and dyes on unmordanted cotton greenish-yellow shades.

Having now particularly described and ascertained the nature of my said invention and in what manner the same is to be performed, I declare that what I claim is:—

1. The process of producing sulfur colors by heating a mixture of a dehydrothiotoluidin and benzidin with sulfur and transforming the product thus obtained into soluble coloring matters by treating with concentrated solutions of strongly alkaline substances substantially as described.

2. The new coloring matter hereinbefore described, which in a precipitated state is a brown powder, insoluble in water, acids and organic solvents, soluble in concentrated sulfuric acid with a yellowish-gray color, being precipitated from this solution by the addition of water in brown flakes, soluble in concentrated soda lye with a yellowish-brown shade, easily soluble in solutions of sodium sulfid and dyeing unmordanted cotton greenish-yellow shades, substantially as described.

Signed at Frankfort-on-the-Main in the Province of Hesse-Nassau, and Kingdom of Prussia, Germany this 5th day of January A. D. 1907.

WERNER SCHMIDT.

Witnesses:
FRITZ FRAENICH,
JEAN GRUND.